United States Patent [19]

Okazaki

[11] Patent Number: 4,716,419

[45] Date of Patent: Dec. 29, 1987

[54] THERMAL TRANSFER PRINTER

[75] Inventor: Yōji Okazaki, Yokohama, Japan

[73] Assignee: Kabushiki Kaisha Toshiba, Kawasaki, Japan

[21] Appl. No.: 31,208

[22] Filed: Mar. 30, 1987

Related U.S. Application Data

[63] Continuation of Ser. No. 756,702, Jul. 19, 1985, abandoned.

[30] Foreign Application Priority Data

Nov. 12, 1984 [JP] Japan ................................ 59-238078

[51] Int. Cl.[4] ................................ G01D 15/16

[52] U.S. Cl. ................................ 346/76 PH; 346/134

[58] Field of Search ................ 346/76 PH, 76 R, 136, 346/134; 400/659, 545, 568, 569, 120; 101/250; 214/216 PH

[56] References Cited

U.S. PATENT DOCUMENTS 3,745,838 7/1973 Brems ................................ 101/250

4,107,700 8/1978 Jornod ................................ 346/76 PH 4,404,568 9/1983 Kikuchi et al. ................ 346/76 PH 4,505,603 3/1985 Yana ................................ 400/120

4,532,524 7/1985 Yana et al. ...................... 346/76 PH

*Primary Examiner*—Arthur G. Evans

*Attorney, Agent, or Firm*—Schwartz, Jeffery, Schwaab, Mack, Blumenthal & Evans

[57] ABSTRACT

A thermal transfer printer in accordance with the present invention is a thermal transfer printer in which the major scanning is carried out by a thermal head and the minor scanning is carried out by the intermittent rotation of the platen, via a timing belt, by means of a step motor. The thermal head is arranged to have the lower running portion of the timing belt as the tension side of the belt, and the angle between the straight line which passes through the axis center of the timing pulley on the platen side and the starting point on the tension side of the wound portion of the belt, of the timing belt of the timing pulley on the platen side, and the second straight line which passes through the axis center of the platen and the center of the thermal head, is chosen to be within 60°.

5 Claims, 9 Drawing Figures

THERMAL TRANSFER PRINTER

This application is a continuation of application Ser. No. 756,702, filed July 19, 1985, now abandoned.

BACKGROUND OF THE INVENTION

1. Field of the Invention

The present invetion relates to a thermal transfer printer in which the major scanning is carried out by a thermal head and the minor scanning is carried out by the intermittent turning of the platen via a timing belt by means of a step motor, and more particularly to a thermal transfer printer which is adapted for reducing the noise that is generated by the intermittent turning of the platen.

2. Description of the Prior Art

As a thermal transfer printer there has generally been known a type in which one line is printed by pressing a heat-sensitive head, via an ink ribbon, against the recording paper which is wound on the platen, and the printing of the next line is carried out by intermittently turning the platen. An example of the prior art thermal transfer printer of the above kind will be described by referring to FIGS. 1 to 4.

As shown in FIGS. 1 and 2, the thermal transfer printer includes a step motor 10 which is arranged to turn a platen 14 intermittently through a timing pulley 12 and a timing belt 18 that is wound round a timing pulley 16 mounted on the platen 14. Here, the upper running portion of the timing belt 18 is set to be the tension side of the belt.

On the other hand, an ink ribbon 20 is arranged to be forwarded by a ribbon feeding motor 21 and a conveyor roller for ribbon winding 22 to an ink ribbon reel 24 by passing directly underneath the platen 14. With the ink ribbon 20 in between, a line-form thermal head 26 is arranged facing the platen 14.

Moreover, the recording paper 28 is fed from the paper supply cassette 30 by a paper supply roller 32, runs between the platen 14 and the ink ribbon 20 through guide plates 33 and a guide roller 35, and is printed on by the thermal head 26 after running around the platen 14 for about one half of its circumference. The recording paper 28 which has been printed is sent out to the paper removal tray 36 by a forwarding roller 34. The thermal transfer printer further includes a power supply unit 37 for driving the step motor and a controller 38 for controlling the turning and the like of the platen 14. The platen 14 is arranged to be supported by a frame 40 (see FIG. 3).

In the prior art thermal transfer printer with the construction as described in the above, the major scanning is carried out by the thermal head 26 while the minor scanning is carried out by the intermittent turning of the platen 14. Namely, the ink ribbon 20 is brought to a direct contact with the recording paper 28 which is wound on the platen 14, and the printing is accomplished by thermal transcription with the thermal head 26. In this operation, the thermal head 26 is pressed against the platen 14 with a force of several kg-weight so that there is required a large torque in order to revolve the platen 14 intermittently. In FIG. 4 there is shown, for the thermal transfer printer with the above construction, a force which acts on the platen 14 in its radial direction. In the figure, $\vec{T1}, \vec{T2}, \vec{T3}, \vec{T4}, \ldots, \vec{Tn}$ are the tensions that act on the teeth G1, G2, G3, G4, . . . , Gn of the timing pulley 16 which is on the platen side. Here, it is known that there exists the following relationship among these tensions.

$$|\vec{T1}| > |\vec{T2}| > |\vec{T3}| > |\vec{T4}| > \ldots > |\vec{Tn}|, \quad (1)$$

In other words, the most significant is the tension on the tooth G1 so that it may approximately be set as $$\vec{T} = \vec{T1} \quad (2)$$

If the friction load vector due to the thermal head 26 is called $\vec{F}$, the force acting in the radial direction of the platen is the radial force vector $\vec{N}$ which is the resultant of the tension vector $\vec{T}$ and the friction load vector $\vec{F}$. In the prior art thermal transfer printer, the thermal head 26 is placed diametrically opposite to the tooth G1 of the timing pulley 16 on the platen side, with the shaft of the platen 42 as the center, so that the directions of the tension vector $\vec{T}$ and the friction vector $\vec{F}$ become approximately equal, producing a radial force vector $\vec{N}$ which is very large. The radial force vector $\vec{N}$ varies periodically due to the intermittent turning of the platen, which used to generate a noise when it is transmitted to the frame 40.

In order to prevent the transmission of vibrations like in the above and to suppress the generation of a noise, there has been tried in the past to insert cylindrical anti-vibration rubber pieces 46 between the frame 40 and the bearings 44 that support the shaft of the platen. However, such an attempt resulted in a new problem that the printing accuracy goes down due to a relative shift in the positions between the heat-sensitive head 26 and the platen 14.

SUMMARY OF THE INVENTION

An object of the present invention is to provde a thermal transfer printer which produces a low noise and yet possesses a high printing accuracy.

Another object of the present invention is to provide a thermal transfer printer which is adapted for suppressing the generation of a noise caused by the intermittent turning of the platen.

One feature due to the present invention is that, in a thermal transfer printer which carries out the major scanning by a thermal head and carries out the minor scanning by the intermittent turning, through a timing belt, of the platen by means of a step motor, the lower running portion of the timing belt is set to act as the tension side of the belt, and the line that passes through the axis center of the timing pulley on the platen side and the starting point of the tension side of the wound portion of the timing belt of the timing pulley on the platen side, makes an angle which is less than 60° with the line that passes through the axis center of the platen and the center of the thermal head.

These and other objects, features and advantages of the present invention will be more apparent from the following description of a preferred embodiment, taken in conjunction with the accompanying drawings.

DESCRIPTION OF THE PREFERRED EMBODIMENT

Figure 1:
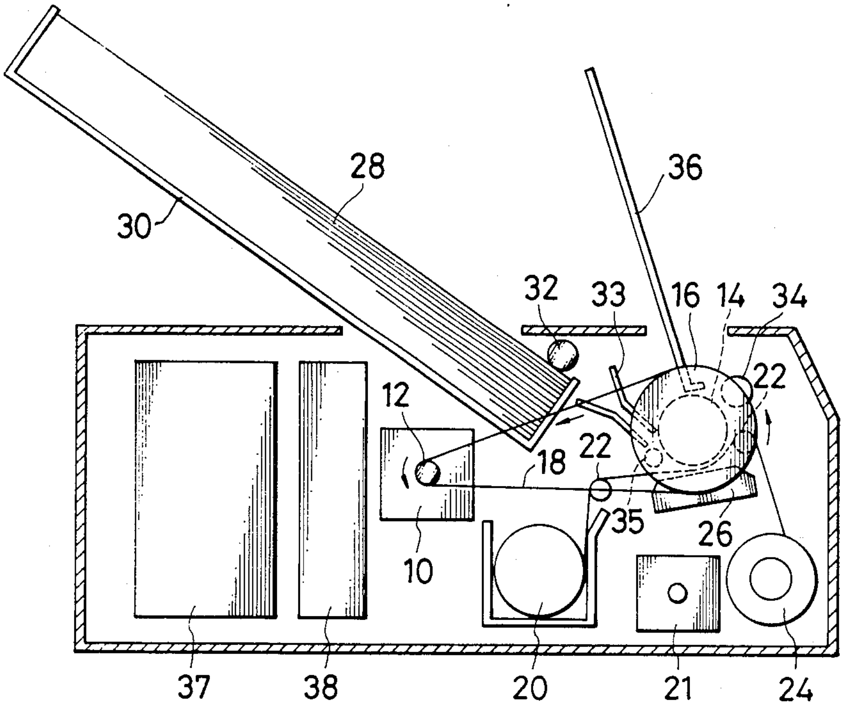
FIG. 1 PRIOR ART
FIG. 1 is an overall side view of a prior art thermal transfer printer.
Figure 2:
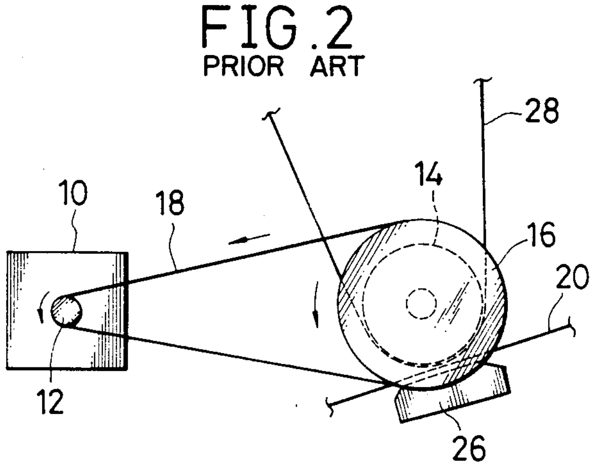
FIG. 2 PRIOR ART
FIG. 2 is the side view of the portion of the platen and the step motor for the printer shown in FIG. 1.
Figure 3:
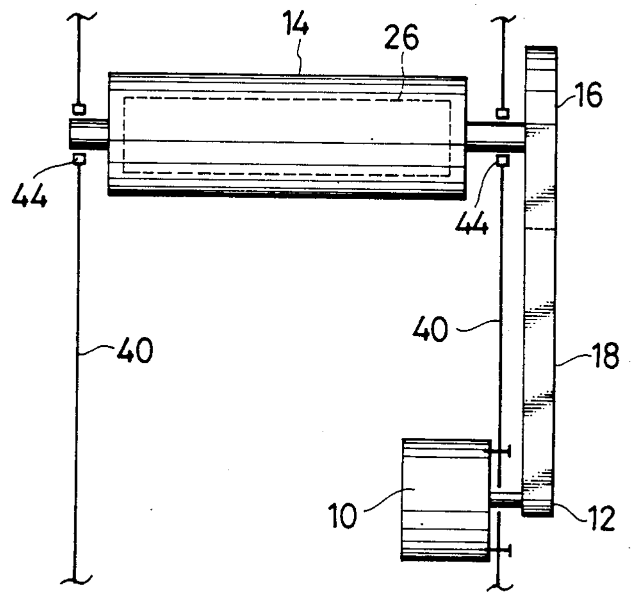
FIG.3 PRIOR ART
FIG. 3 is the plan view of the portion shown in FIG. 2.
Figure 4:
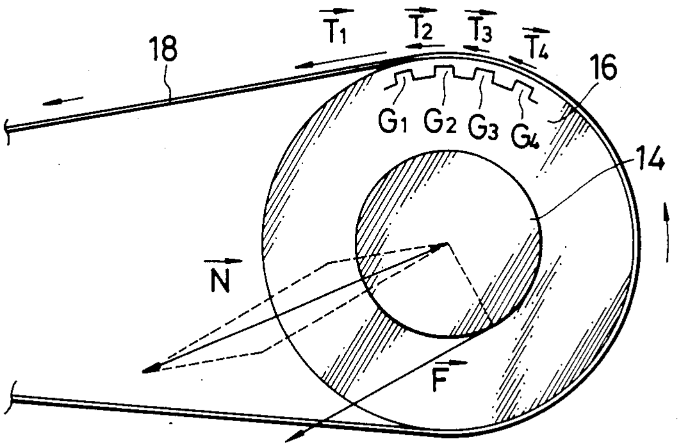
FIG.4 PRIOR ART
FIG. 4 is a schematic diagram for illustrating the forces that act on the platen for the printer shown in FIG. 1.
Figure 5:
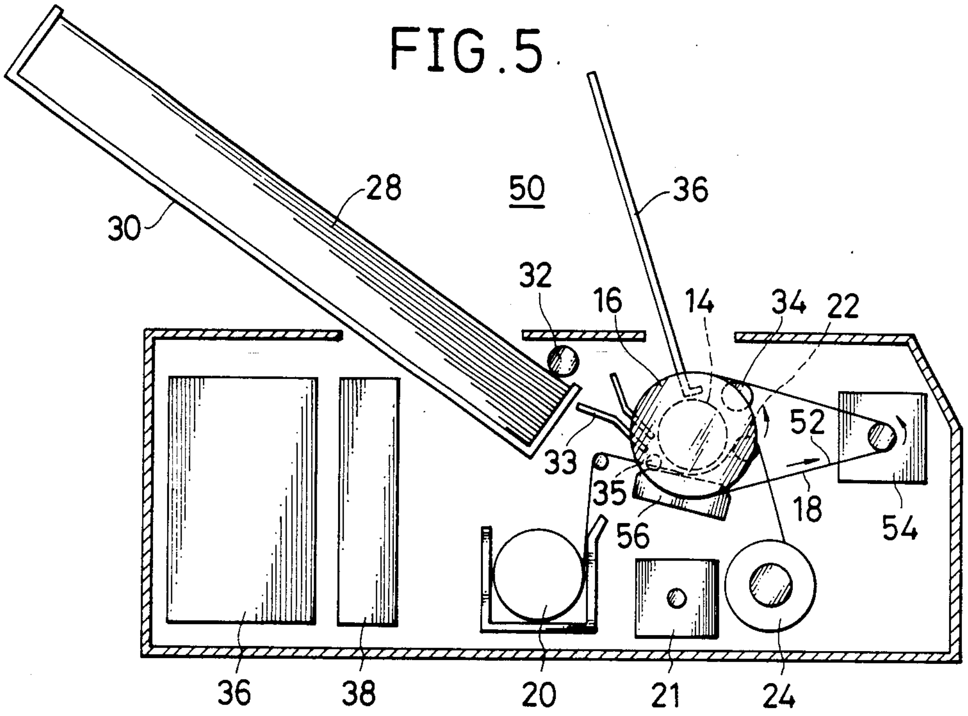
FIG. 5 is an overall side view of a thermal transfer printer embodying the present invention.
Figure 6:
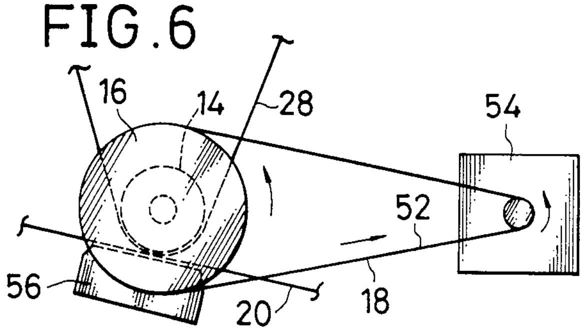
FIG. 6 is the side view of the portion of the platen and the step motor for the printer shown in FIG. 5.
Figure 7:
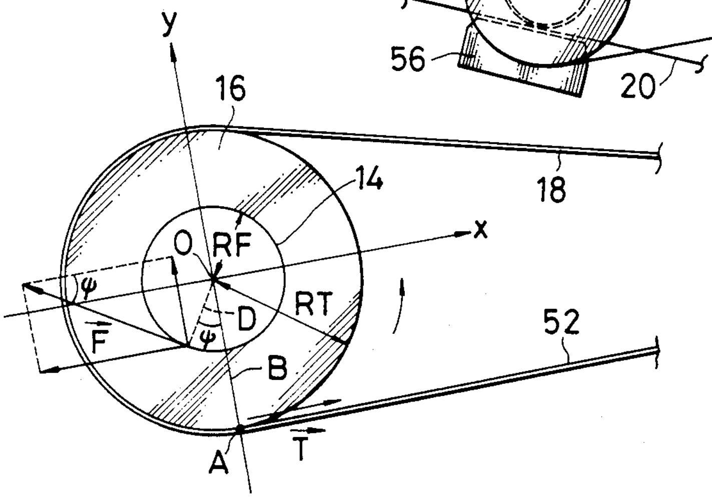
FIG. 7 is a schematic diagram for illustrating the force that acts on the platen for the printer shown in FIG. 5.

Referring to FIGS. 5 to 7, a thermal transfer printer embodying the present invention is shown with a reference numeral 50.

In the thermal transfer printer 50, the elements identical to those in the prior art thermal transfer printer are given identical symbols to omit further explanation. In the thermal transfer printer 50, a step motor 54 is arranged so as to have the lower running portion 52 of the timing belt 18 as the tension side of the belt. Further, the position of the thermal head 56 is selected as follows. Namely, the angle $\psi$ between a first straight line B which joins the center of the timing pulley, namely, the axis center, of the platen 14 and the starting point A of the tension side of the wound portion of the belt of the timing pulley which is on the platen side, and a second straight line D which joins the center of the thermal head 56 and the axis center of the platen 14, is chosen to be less than 60°. Moreover, the thermal head 56 is arranged close to the platen 14 to have its printing surface to be parallel to the tangent to the peripheral surface of the platen at the point where the second straight line D passes through the peripheral surface of the platen 14.

The force acting on the platen 14 in its radial direction will now be described by referring to FIG. 7. By taking the axis center of the platen 14 as the origin O, y axis is chosen to be the straight line which passes through the origin O and the starting point A on the tension side of the wound belt of the timing pulley 16, and x axis is chosen to be the straight line which intersects the y axis at right angle at the origin O. Although the tension due to the timing pulley 18 is exerted distributively on the teeth G of the timing pulley 16, it may be approximated that it acts on the tooth G1 which is located at the starting point of the tension side of the belt as a vector $\vec{T}$. On the other hand, the friction load vector $\vec{F}$ due to the thermal head 56 acts on the platen 14 at the position with an angle $\psi$ from the y axis with the origin O as the center. The tension vector and the friction load vector are related by the following equation of motion.

$$|\vec{T}| \cdot R_T = |\vec{F}| \cdot R_F + [(J_m + J_L)/g] \cdot [d\omega/dt] \quad (3)$$

Here, $R_T$ is the radius of the timing pulley 16 and $R_F$ is the radius of the platen 14. In addition, $J_m$ is the moment of inertia of the step motor 54 and $J_L$ is the moment of inertia of the platen 14 and the timing pulley 16. Furthermore, $\omega$ is the angular velocity and g is the acceleration of gravity. If it is assumed that the inertia term $$[(Jm + J_L)/g] \cdot [d\omega/dt]$$

is sufficiently small compared with the torque of the load $|\vec{F}| \cdot R_F$, then one has $$|\vec{T}| \cdot R_T = |\vec{F}| \cdot R_F \quad (4)$$

On the other hand, the forces acting on the shaft of the platen in the x and y axis due to the friction load vector and the tension vector are given by the following.

$$N_x = -|\vec{F}| \cos\psi + |\vec{T}|, \quad (5)$$

$$N_y = +|\vec{F}| \sin\psi, \quad (6)$$

By writing $$|\vec{F}| = (R_T/R_F) \cdot |\vec{T}| = a\,|\vec{T}|$$

from Eq. (4), the above equations become $$N_x = |\vec{T}| (1 - a \cos\psi), \quad (7)$$

$$N_y = |\vec{T}| (+ a \sin\psi) \quad (8)$$

Then, the absolute value $|N|$ of the radial force that acts on the shaft is given by $$|\vec{N}| = \sqrt{N_x^2 + N_y^2} = |\vec{T}| \sqrt{a^2 + 1 - 2a\cos\psi} \quad (9)$$

If one sets $$h(\omega) = a^2 + 1 - 2a \cos \psi, \quad (10)$$

then $$dh(\psi)/d\psi = 2a \sin \psi \quad (11)$$

Therefore, $$dh(\psi)/d\psi > 0 \text{ for } 0° < \psi < 180°$$

so that $h(\psi)$ represents an increasing function in the above range of $\psi$, whereas $$dh(\psi)/d\psi < 0 \text{ for } 180° < \psi < 360°$$

so that $h(\psi)$ represents a decreasing function of $\psi$ in this range. Therefore, regardless of the value of a, $h(\psi)$ has a minimum value at $\psi = 0°$ and 360° and a maximum value at $\psi = 180°$.

Figure 8:
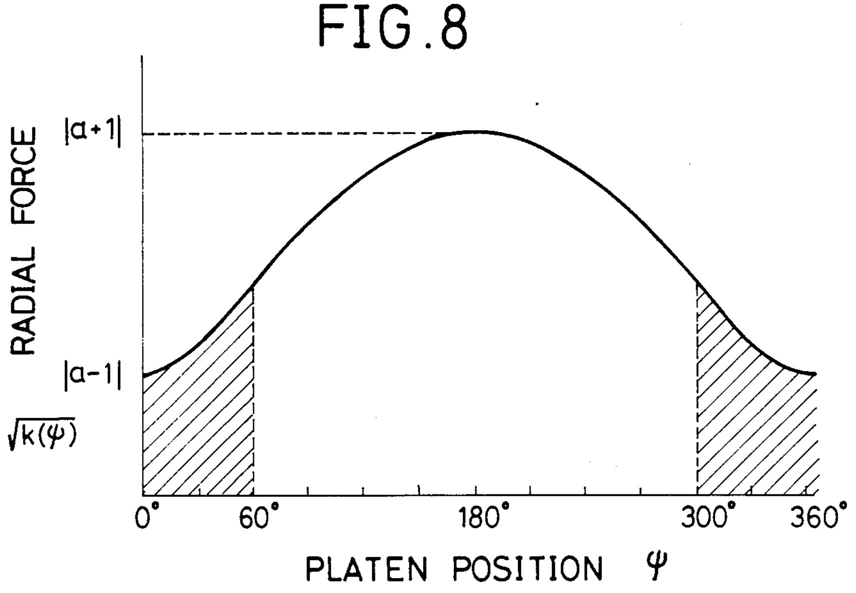
FIG. 8 is a graph showing the result of computation of the radial force on the platen in the printer shown in FIG. 5.

The result of calculation of $\sqrt{h(\psi)}$ with the parameter $\psi$ is the graph shown in FIG. 8.

Figure 9:
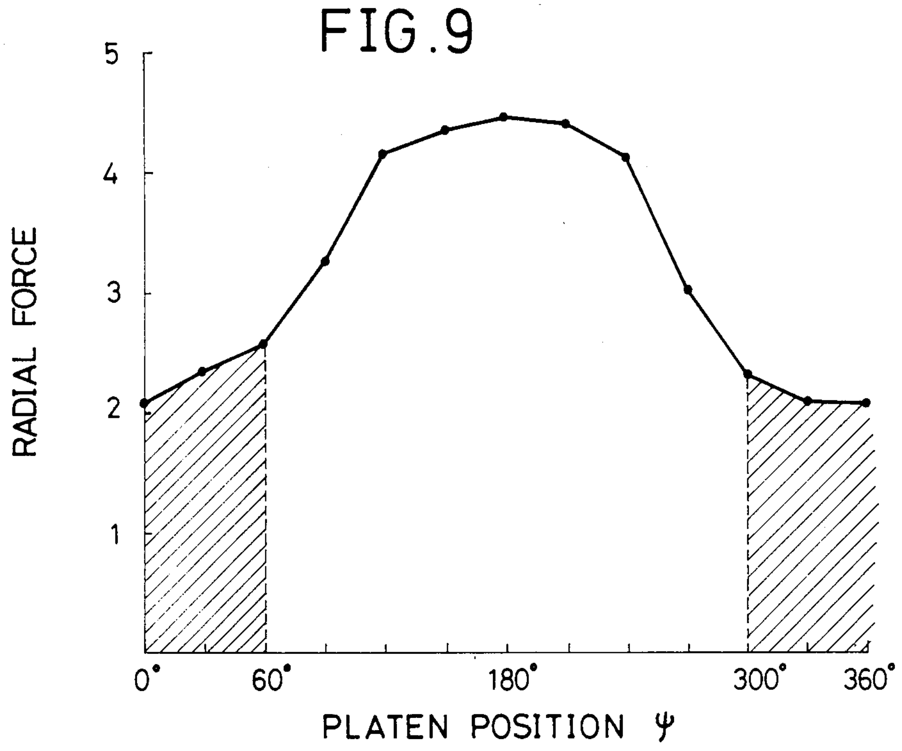
FIG. 9 is a graph showing the result of measurement of the radial force on the platen in the printer shown in FIG. 5.

The experimental result for a=2 is shown by the graph of FIG. 9.

As is clear from FIGS. 8 and 9, either result of calculation and experiment indicates that the magnitude $|\vec{N}|$ of the radial force can be made sufficiently small compared with the case of 104=180° if $\psi$ is restricted to the range $0 < \psi < 60°$ or $300° < \psi < 360°$.

The prior art thermal transfer printer has been given a construction in which $\psi$ is to have a value in the neighborhood of 180° with respect to the tension side of the timing belt.

Therefore, with large radial force $|\overrightarrow{N}|$, there were created large vibrations, generating a noise. In contrast, the thermal transfer printer in accordance with the present invention is given a construction in which the lower running portion, for example, of the timing belt is to become the tension side of the belt and the angle $\psi$ remains within 60°, so that the magnitude $|\overrightarrow{N}|$ of the radial force is diminished, reducing the vibrations to be transmitted to the frame and the noise. For the case of $a=2$ and $\psi=0°$, the calculation predicts a reduction of 9.5 dB in the noise level for which reduction of 7 dB in the noise level was confirmed by the experiment.

Furthermore, for the case of $a=2$ and $\psi=60°$, the calculation predicts reduction of about 5 dB in the noise level.

Moreover, in the thermal transfer printer of the present invention, no use is made of anti-vibration rubber pieces to be inserted between the frame and the bearings that support the shaft of the platen, so that there will arise no reduction in the printing accuracy due to the relative displacement between them. In addition, it is of course true for the case of reversing the direction of turning of the platen that the position at which the thermal head is to be installed is reversed with respect to the vertical direction.

As may be clear from the above, the thermal transfer printer in accordance with the present invention is adapted for suppressing the generation of noise caused by the intermittent turning of the platen, whereas there will occur no reduction in the printing accuracy to any degree. Therefore, it will be extremely effective in preventing the increase of noise within an office that may be brought about by the spreading of office automation.

Various modifications will become possible for those skilled in the art after receiving the teachings of the present disclosure without departing from the scope thereof.

What is claimed is:

1. A thermal transfer printer for thermally recording, with an ink ribbon, information on recording paper wound on a platen, comprising:
   - a step motor for intermittently turning the plate by means of a timing belt and a timing pulley; and
   - a thermal head for thermally recording information on the recording paper via the ink ribbon, said thermal head having a face positioned adjacent said platen at a location defined by an angle formed by (a) a line originating from an axial center of the platen and extending to a starting point of a tension side of said timing belt on said timing pulley, and (b) a line originating from said axial center and extending to a center of said thermal head face, said angle being between 0° and about 60°.

2. A thermal transfer printer as claimed in claim 1, in which the angle between the first and second straight lines is about 0°.

3. A thermal transfer printer as claimed in claim 1, in which the printing surface of said thermal head is parallel to the tangent to the peripheral surface of the platen at the point where the second straight line passes through the peripheral surface of the platen.

4. A thermal transfer printer as claimed in claim 1, in which said step motor is disposed so as to have the lower running portion of the timing belt to be the tension side of the belt.

5. A thermal transfer printer as claimed in claim 1, wherein said step motor includes an output spindle.

* * * * *